(12) United States Patent
Detronde

(10) Patent No.: US 7,381,365 B2
(45) Date of Patent: Jun. 3, 2008

(54) PRODUCTION OF PRODUCTS FROM STEEL SLAGS

(75) Inventor: Michel Detronde, Maidieres (FR)

(73) Assignee: Heckett Multiserv PLC (GB)

( * ) Notice: Subject to any disclaimer, the term of this patent is extended or adjusted under 35 U.S.C. 154(b) by 0 days.

(21) Appl. No.: 10/475,386

(22) PCT Filed: Mar. 1, 2002

(86) PCT No.: PCT/GB02/00846

§ 371 (c)(1),
(2), (4) Date: Oct. 20, 2003

(87) PCT Pub. No.: WO02/070420

PCT Pub. Date: Sep. 12, 2002

(65) Prior Publication Data

US 2004/0130077 A1  Jul. 8, 2004

(30) Foreign Application Priority Data

Mar. 1, 2001  (FR) ................................. 01 02782

(51) Int. Cl.
*C21C 1/00* (2006.01)
(52) U.S. Cl. .................................................. 266/201
(58) Field of Classification Search .................. 266/201
See application file for complete search history.

(56) References Cited

U.S. PATENT DOCUMENTS 2,661,575 A    12/1953  Kennedy 3,607,168 A *  9/1971  Grady ............................ 65/19
4,670,049 A *  6/1987  Kelmar ......................... 75/464
4,978,107 A * 12/1990  Hulek et al. ................. 266/201
6,196,479 B1 * 3/2001  Edlinger ......................... 241/1

FOREIGN PATENT DOCUMENTS

| CH | 236803 | | 3/1945 |
| DE | 2251127 | A * | 4/1974 |
| JP | 2000-143302 | | 5/2000 |
| WO | WO 01/04064 | A1 | 1/2001 |

OTHER PUBLICATIONS

English language translation of Japanese 2000-143302, May 2000.*

* cited by examiner

*Primary Examiner*—Scott Kastler
(74) *Attorney, Agent, or Firm*—Caesar, Rivise, Bernstein, Cohen & Pokotilow, Ltd.

(57) ABSTRACT

A method for treatment of metallurgical wastes i.e. slags, which are in liquid form by introducing water into the liquid slag thus causing it to cool at a slow rate so that the solidified slag contains a porous crystalline or utrified structure according to the rate of cooling, which structure is stable at ambient temperature. Another object of the invention concerns an apparatus for treating solid metallurgical slags, comprising a continuous conveyor formed of molds and means adapted to diffuse water into the liquid slag.

6 Claims, 3 Drawing Sheets

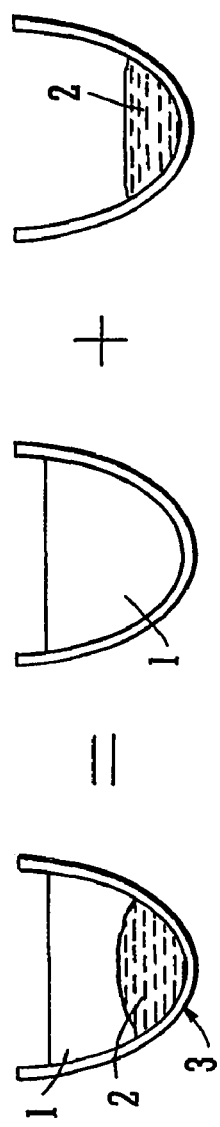
FIG. 1
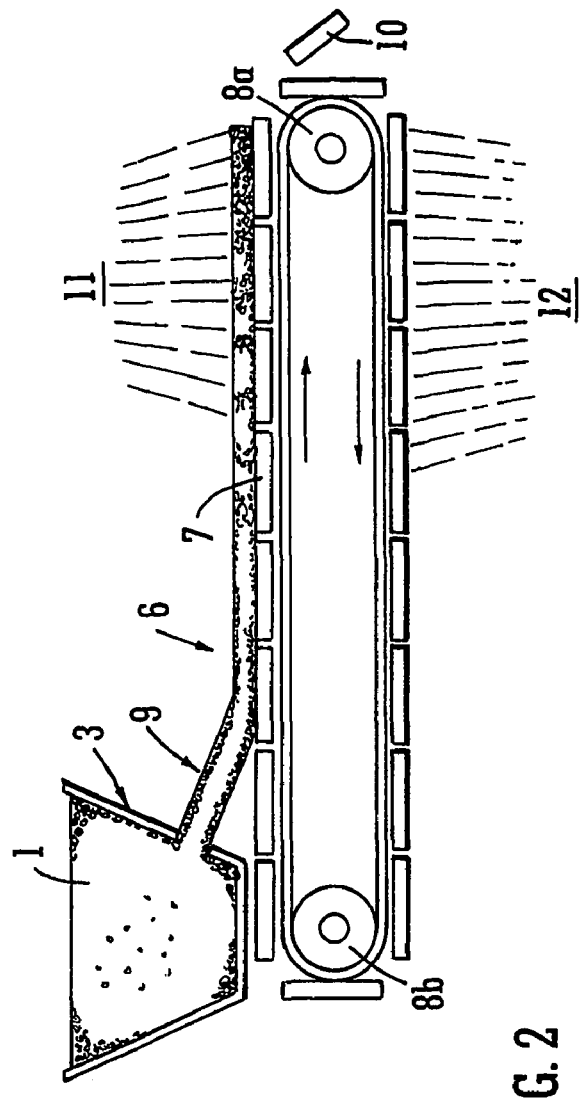
FIG. 2
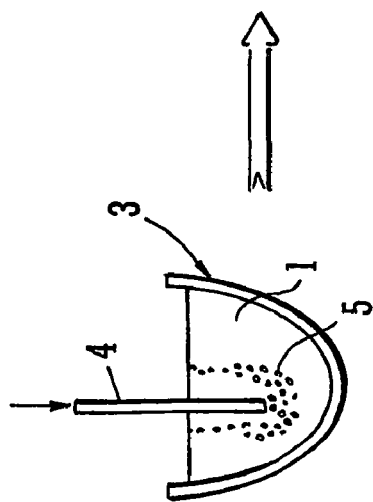

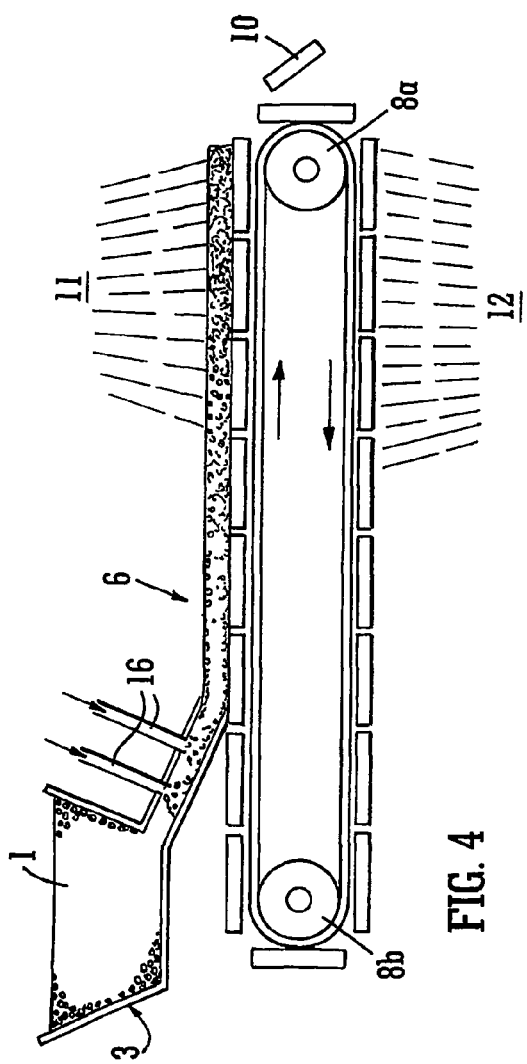
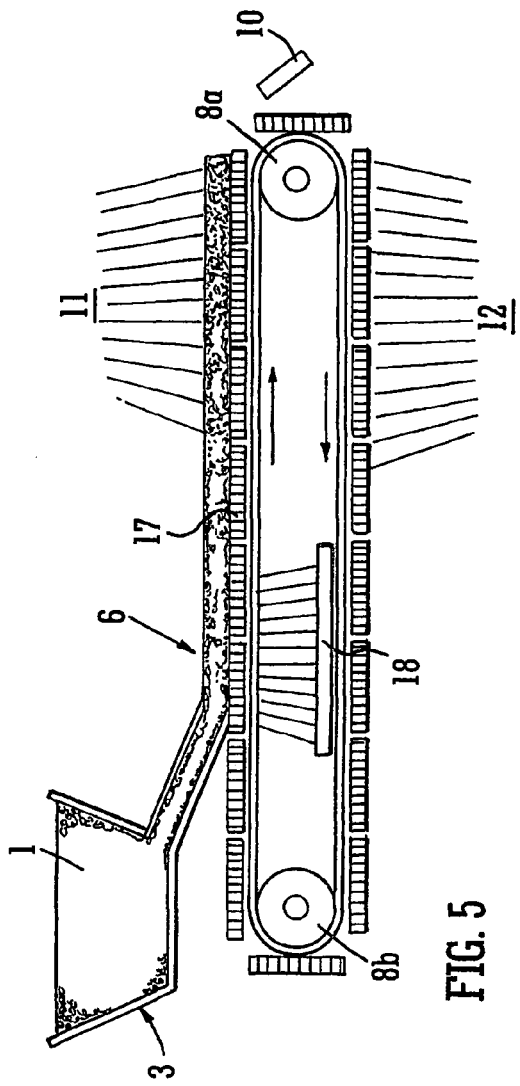

PRODUCTION OF PRODUCTS FROM STEEL SLAGS

The present invention concerns a method for treating solid metallurgical waste commonly known as "slags" coming from steelworks furnaces of the Linz Donavitz convertor, electric arc or similar, capable of being used by converting, for instance, into the composition of cement, aggregate or similar, and devices implementing the method.

In the area of metallurgy, there well known methods involving the treatments of slags which are recovered at the base of blast furnaces in order to allow their recycling. The most widespread method, such as the method described in DE-A-2852993, consists in pouring the molten slag into a large vessel filled with water in which the slag bursts into pieces by reason of thermal shock. This type of method has the drawback of requiring a heavy and cumbersome plant in order not only to protect the operatives from slag explosions but also in order to remove the particles of solidified slag after they have cooled.

In order to avoid this drawback, dry cooling blast furnace slag treatment methods have already been devised; see for instance, WO97/43455 describing a method for the continuous production of a vitreous or vitrified blast furnace slag. According to this method, the slag is applied on a cooling roller or on to cooling slabs joined together in an articulated manner on an endless conveyor belt and cooling of the slag being effected dry, i.e. without water spraying. The liquid slag is carried to an intermediate vessel, removed from this vessel at temperatures higher than 1350° C. into a distribution system in parallel sections onto a continuous belt supporting the cooling slabs or on a cooling roller, the cooled slag being finally ejected and broken up in a crusher or grinder.

If the blast furnace slag has a sufficient chemical stability, the particles of solid slag obtained according to these methods are then graded according to their grain size into processing for ballast for railway tracks, into the processing of bitumen, cements etc.

However, in the area of metallurgy, and more particularly in that of the steelworks, there are well known oxygen lance steelworks furnaces called LD furnaces, convertor furnaces, electric arc furnaces (E.A.F.), refining furnaces under partial vacuum of the A.O.D. or V.O.D. type or similar which produce slags which, after treatment according to the methods such as described previously, have a higher lime content and an unstable chemical structure so that in contrast to blast furnace slags, only a tiny fraction of this slag can be used. As a result slag coming from these furnaces is usually poured into open air pits causing the risk of pollution.

One of the objects of the invention is therefore to provide a method for treating such slags (coming from steelworks furnaces of the LD type, convertor or similar) to provide a structure which is stable at ambient temperature so as to allow them to be utilised.

To this purpose and according to the invention, one aspect of the invention there is provided a method for the treatment of steel wastes, commonly called steel slags, which are in a liquid form at a temperature which is higher than 1000° C. on coming out of a steelworks furnace of the LD type, convertor, electric arc or similar, and are cooled to a temperature at which the liquid slag starts to solidify, the method comprising (i) introducing water into the liquid steel slag and (ii) causing the resultant material to cool at a slow rate so that the solidified steel slag contains a porous, crystalline or vitrified structure according to the rate of cooling, which structure is stable at ambient temperature.

According to a first variant of the method according to the invention, the water is introduced by means of at least one lance, e.g. into the mass of liquid slag in such a manner that on contact with the slag the water converts into water vapour which diffuses into the slag without causing an explosion, then the slag is poured in streams onto a conveyor in order to cool it slowly.

According to another variant of the invention, the water is introduced into a stream of liquid slag, passing from a tundish in which the slag is collected from the furnace to the convertor where it is cooled.

According to another variant of the invention, the method consists in continuously pouring a fine granular material on a conveyor formed by a continuous conveyor, then in spraying water on a fine granular material so as to moisten it and in pouring continuously the liquid slag on to the moistened fine granular material, so that the water contained in the fine granular material is converted into water vapour which diffuses into the slag. The fine granular material consists preferably of an aggregate of metallurgical slag with an average particle size of between 0 to 6 mm conveniently known as fines. The water is sprayed onto the fines in such a way that the moisture is retained but does not form a continuous body of water.

In order to modify the properties of the solid slag obtained by improving, e.g. the "hydraulicity" of the slag in such a manner that the latter can enter into the composition of a cement, an additive consisting in one or a number of elements—according to the nomenclature of the cement constituents—Si, Al, Fe, Ca, Cr, O, C, B, K, F, and P is introduced with the water or into the slag.

Furthermore, the volume of water diffused in the slag is at least equal to the volume of water necessary to transform the hydratable lime contained in the liquid slag from the steelworks furnaces.

Another object of the invention concerns a device for treating solid metallurgical slags, the which are in a liquid form and which is collected in a tundish on coming out from the blast furnace or a steelworks furnace of the LD type, convertor, electric arc or similar, being poured continuously and in a stream on a continuous conveyor formed of articulated moulds so as to cool gradually the solidifying liquid slag, characterised in that comprises means capable of diffusing water in the liquid slag without causing an explosion.

It will be readily understood that the water introduced into the slag, on contact with the liquid slag after cooling converts into water vapour which diffuses in the slag to obtain a porous structure in the latter when it is solidified. Moreover the diffusion of the water in the slag combined with slow cooling provides the solidified slag with a crystalline or vitreous structure which is stable at ambient temperature allowing the slag to be utilised. In addition, the economic significance of the method according to the invention which makes it possible to enhance the economic value of the slag from steelworks furnaces, contrary to prior art, considerably improving the profitability of steelworks, will be readily understood.

The rate of cooling and the total period of cooling will be selected according to the phase or phases to be formed in the end product.

Other advantages and characteristics will appear better from the description below of a number of variants, given as non-limitative examples of the slag treatment method and devices implementing the method, with reference to the attached drawings where:

FIG. 1 is a schematic representation showing a preliminary treatment stage of the liquid slag;

FIG. 2 is a schematic partial longitudinal section of a device of the invention;

FIG. 4 is schematic partial longitudinal section of a second variant of the device of the invention; and FIG. 5 is schematic partial longitudinal section of a last variant of the device of the invention.

Figure 3:
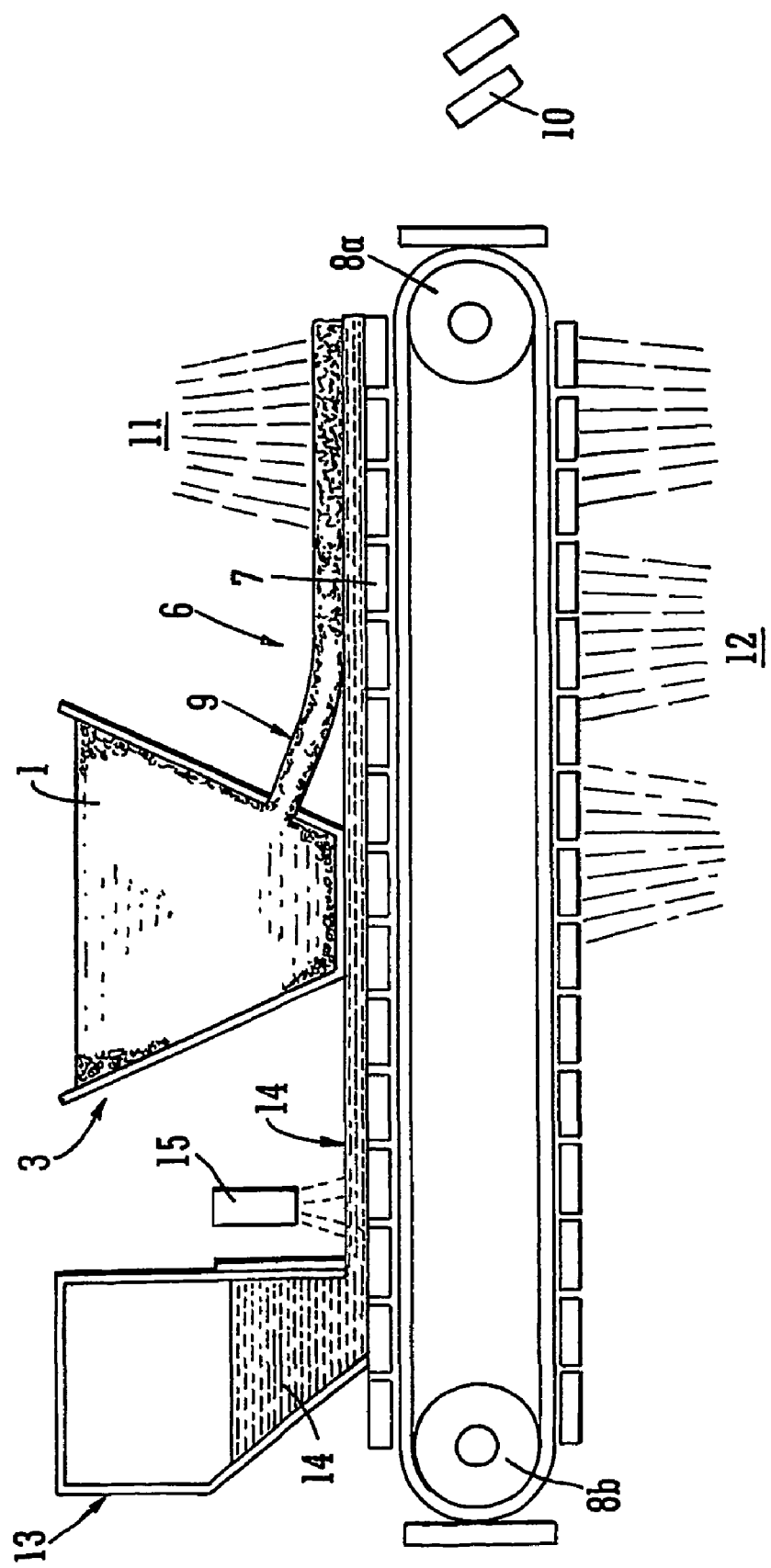
FIG. 3 is a schematic partial longitudinal section of a first variant of the device of the invention.

With reference to FIG. 1, the molten material coming from a steelworks furnace is conventionally formed of slag 1 and residual steel 2 which is poured into a tundish 3. The residual steel 2 being denser than the slag 1 is deposited on the bottom of the tundish 1 after pouring out, the it is separated from the slag 1 according to a process well known to the expert, the said residual steel 2 being treated separately.

The slag 1 which is contained in the tundish 3 at a temperature higher than 1000° C., with reference to FIG. 2, is liquid. The treatment of the said slag 1 consists in introducing water, at ambient temperature for instance, through a lance 4 plunged into the said slag 1. On contact with the liquid slag 1, the water converts into water vapour 5 which diffuses in the slag providing it with agitation and oxidising the elements of the said slag 1 in such a manner that, after it has cooled, the solidified slag has a crystalline or vitrified structure which is stable at ambient temperature as will be seen further on. In addition, it will be noted that as the lance 4 is plunged sufficiently deeply in the slag 1 the introduction of water into the slag 1 does not cause a violent disruption of the material.

In order to cool the slag 1, the tundish 3 is placed to the right of a continuous conveyor 6 carrying moulds 7 of cast iron or steel articulated in two parts and extending between a leading roller 8a and a led roller 8b. The moulds 7 have a thickness which is defined by the quantity of heat to be absorbed in a time interval given by the dimensions of the continuous conveyor 6 and by the forward speed of the conveyor 6. The slag 1 is poured into a pouring chute 9 opening out above the moulds 7 of the conveyor 6 so as to pour the slag 1 on to the moulds 7 continuously and in a stream. The continuous conveyor 6 advance rate is chosen so that the thickness of the strip of slag 1 is between 3 and 5 cm approximately so as to obtain slow cooling of the said slag 1. This slow cooling of the slag 1 makes it possible to avoid instantaneous solidification and to maintain, notably, the calcium/silicate $C_3S$ and/or $C_2S$ phases of the slag 1 in crystalline form, the crystalline form being obtained by means of introduction of water into the liquid slag 1 before it is cooled as has been described above. In this respect, the water vapour 5 diffused in the slag 1 is trapped by the slag 1 in the course of cooling obtaining a porous structure of the solidified slag 1.

At the end of the continuous conveyor 6, to the right on FIG. 2, the solidified slag 1 the porous structure whereof makes it friable or crumbly or flaky so that it fractures to form particles of slag 1 which can be recovered. In a particularly advantageous manner, the particles are ground, crushed or granulated, then sieved to grade them to obtain granular materials of different dimensions such as rubble, riddled material etc capable of being used as railway track ballast, or added to aggregate, cement or similar.

In a variation water can be fine sprayed on the solidifying slag 1 close to the end of the conveyor 6, as indicated by the arrows 11 of FIG. 2, so as to finalise the cooling of the slag 1. Moreover, water can also be fine sprayed on the moulds 7 in the course of their return path, as indicated by the arrows 12, in order to cool them.

It is quite obvious that in order to improve the physical and chemical properties such as the "hydraulicity" of the solidified slag obtained according to the invention, an additive may advantageously be introduced into the water and/or the slag 1. The additive may contain one or more of a number of elements such as Si, Al, Fe, Ca, Cr, O, B, K, F and P.

According to a variant of the treatment device of the invention, shown in FIG. 3, the device comprises a hopper 13 containing a fine granular material 14 which consists, preferably, in fines, i.e. in a granular material of metallurgical slag the mean diameter of which is between 0 and 6 mm. The hopper 13 is positioned to the right of the continuous conveyor 6 above the tundish 3 containing the slag 1 and defines means adapted to pour the granular material on the conveyor 6. The device comprises means for spraying water 15 positioned to the right of the conveyor 6 between the hopper 13 and the tundish 3 in order to moisten the granular material 14. The water is, preferably, sprayed on the granular material 14 by finely spraying in such a manner that the granular material is not saturated with water, i.e. that no pool of water is formed on the surface of the granular material 14. In the same manner as above, the liquid slag 1 is poured continuously and in a stream through the pouring chute 9 on the granular material 14 moistened so that on contact with the slag 1, the water converts into water vapour which diffuses in the slag 1. Besides the agitation obtained by diffusion of the water vapour in the slag 1 which makes it possible to obtain, after it has been cooled, a slag with a crystalline structure which is stable at ambient temperature, the diffusion of the water vapour entrains the particles of "fines" which combine in the slag to provide it with enhanced physical and chemical properties.

According to another variant shown in FIG. 4, the device comprises, in the same manner as above, a continuous conveyor 6 formed of cast iron or steel moulds 7 articulated in pairs and extending between a leading roller 8a and a led roller 8b and a tundish 3 containing the liquid slag 1 which is poured continuously and in a stream through a pouring spout 9 on the moulds 7. The device comprises, in addition, lances 16 positioned along the pouring spout 9 and opening out into the stream of slag 1 in order to introduce water into the stream, which vaporises on contact with the slag 1 to provide the agitation necessary to the formation of a crystalline structure of the slag as described above.

It is obvious that the device according to the invention may comprise only a single lance 16. In another variant shown in FIG. 5, the device comprises for the one part a continuous conveyor 6 formed of cast iron or steel screens 17 articulated in pairs with a fine mesh and extending between a leading roller 8a and a led roller 8b and for the other part a tundish 3 containing the liquid slag 1 which is poured continuously and in a stream through a pouring spout 9 on to the screens 17. The device comprises, in addition, means for spraying 18 water on the internal face of the screens 17, i.e. on the face opposite the face on which the slag 1 is poured, the sprayers 18 being positioned between the upper edge and the lower edge (called return) of the continuous conveyor 6 at the level of the pouring point of the slag 1 on the conveyor 6 or slightly below this point. It is worth noting that the water trapped between the mesh of the screens 17 converts, on contact with the slag 1, into water vapour which diffuses in the slag before it cools gradually.

It will be observed that the solidified slag obtained according to the method of the invention consists of a porous solidified slag in which the calcium silicate phases are stable and in crystalline form. Moreover, according to the volume of water used in the course of the process, the solidified slag may comprise or include hydrated lime.

It is obvious that, according to the selected cooling time of the slag 1, a solidified slag will be obtained which has a crystalline structure or a vitrified structure which are both stable at ambient temperature.

Finally, it is obvious that the method according to the invention may be implemented for blast furnace slag, although the treatment of blast furnace slag is not necessary taking into account its natural stability, and that the examples which have just been given are only particular illustrations which are not intended to limit the uses of the invention.

The invention claimed is:

1. A method for treating steel slags coming out from steelworks furnaces of the LD type, converter, electric arc or similar, being poured continuously onto continuous/endless conveyor formed of moulds and moved in order to gradually cool the liquid slag which is solidifying, wherein said method comprises introducing a lance to penetrate the liquid steel slag and thereby introducing and diffusing water into the liquid slag without causing an explosion thereof.

2. A method according to claim 1, comprising introducing at least one lance into a tundish containing the liquid slag before the slag is poured on the conveyor.

3. A method according to claim 1, further including pouring a fine granular material from a hopper adjacent the conveyor onto the conveyor and spraying water onto the fine granular material.

4. A method according to claim 1, further comprising controlling the rate at which the resultant material cools so that the solidified steel slag has a porous, crystalline or vitrified structure dependent on the rate of cooling, which structure is stable at ambient temperature.

5. A method according to claim 1, including introducing the lance into the slag flowing into a pouring chute that its inclined downwards from a tundish to the conveyor.

6. A method according to claim 1, including providing the conveyor made from fine mesh screens arranged in pairs and spraying water on the internal face of the screens.

* * * * *